US012490880B2

(12) United States Patent
Brewer et al.

(10) Patent No.: US 12,490,880 B2
(45) Date of Patent: *Dec. 9, 2025

(54) DIFFUSED LIGHT SOURCE FOR APPLIANCE CONTROL PANEL DISPLAY

(71) Applicant: Haier US Appliance Solutions, Inc., Wilmington, DE (US)

(72) Inventors: Kyle James Brewer, Louisville, KY (US); Timothy David Kaiser, Louisville, KY (US); Brian J. Morman, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 318 days.

This patent is subject to a terminal disclaimer.

(21) Appl. No.: 18/095,176

(22) Filed: Jan. 10, 2023

(65) Prior Publication Data

US 2024/0225410 A1 Jul. 11, 2024

(51) Int. Cl.
*A47L 15/42* (2006.01)
*F21V 33/00* (2006.01)

(52) U.S. Cl.
CPC ....... *A47L 15/4293* (2013.01); *A47L 15/4257* (2013.01); *F21V 33/0024* (2013.01)

(58) Field of Classification Search
CPC ............. A47L 15/4293; A47L 15/4257; F21V 33/0024
See application file for complete search history.

(56) References Cited

U.S. PATENT DOCUMENTS

| | | | | |
|---|---|---|---|---|
| 6,598,987 | B1 * | 7/2003 | Parikka | H04M 1/22 362/85 |
| 9,179,554 | B2 | 11/2015 | Schuh | |
| 9,464,781 | B1 * | 10/2016 | Bach | F24C 7/083 |
| 9,683,731 | B2 * | 6/2017 | Kim | A47L 15/4274 |
| 10,147,571 | B2 * | 12/2018 | Ebrom | G05G 1/105 |
| 10,416,372 | B2 * | 9/2019 | Doering | G02B 6/009 |
| 10,687,686 | B2 * | 6/2020 | Brewer | A47L 15/4257 |
| 10,731,918 | B1 | 8/2020 | Patel et al. | |
| 10,921,048 | B2 * | 2/2021 | Kim | F25D 23/02 |
| 11,266,291 | B1 | 3/2022 | Gross et al. | |
| 11,918,165 | B2 * | 3/2024 | Gross Berry | F21V 3/00 |
| 2020/0049401 | A1 * | 2/2020 | Staud | G03B 21/2033 |
| 2020/0129040 | A1 * | 4/2020 | Brewer | A47L 15/4257 |
| 2024/0099548 | A1 * | 3/2024 | Berry | F21V 7/0008 |

FOREIGN PATENT DOCUMENTS

| | | |
|---|---|---|
| JP | 5218598 B2 | 6/2013 |

* cited by examiner

*Primary Examiner* — Benjamin L Osterhout
(74) *Attorney, Agent, or Firm* — Dority & Manning, P.A.

(57) ABSTRACT

A control panel for an appliance includes a printed circuit board defining a top surface, a light source mounted to the top surface of the printed circuit board for selectively generating light, a control cover mounted to the top surface of the printed circuit board, the control cover comprising a bottom surface, a top surface, and an indicator zone, the control cover defining light diffusion channel extending into the bottom surface of the control cover, and a light diffuser extending into the light diffusion channel to define a light recess configured to receive the light source, light recess being offset from the indicator zone by a diffusion distance measured perpendicular to an illumination direction.

20 Claims, 6 Drawing Sheets

DIFFUSED LIGHT SOURCE FOR APPLIANCE CONTROL PANEL DISPLAY

FIELD OF THE INVENTION

The present subject matter relates generally to household appliances, and more particularly to household appliances with backlit displays.

BACKGROUND OF THE INVENTION

Household appliances often include doors for providing selective access to cabinets or cavities of the appliance. These doors often have an inner cavity and an outer panel. The inner cavity may be filled with fiberglass or insulating foam, e.g., for thermal insulation, sound dampening, etc. Additionally or alternatively, some household appliances may have control panels that are integrated into a top of a door, e.g., a dishwasher door. The integrated control panels may minimize features on the outer door and provide a clean look. Control panels may have status indicators located on the outer panel of the door (e.g., a top panel of the door) to provide information regarding appliance operation such as a status of an operating cycle or an indication that an operating cycle is complete.

Challenges exist, in that dishwasher doors generally have limited space where electronics can be mounted. For example, some control panels include a printed circuit board positioned directly below the top surface of the control panel with light sources mounted on top of the printed circuit board below indicator zones to light up those zones. However, the short distance between the light sources on the printed circuit board and the indicator zones or surfaces that they illuminate may provide for poor diffusion of the light, resulting in either a poor visual representation to the consumer, with some areas having better light than others, or a need for many lights in a relatively small area to maintain similar light intensity throughout the indicator zone.

Accordingly, a household appliance with improved illumination capabilities would be beneficial. Additionally, a control panel with a control cover having improved indicator zones that provide a uniform light intensity over a broader surface area would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a control panel for an appliance is provided, the control panel defining an illumination direction and comprising a printed circuit board defining a top surface, a light source mounted to the top surface of the printed circuit board for selectively generating light, a control cover mounted to the top surface of the printed circuit board, the control cover comprising a bottom surface, a top surface, and an indicator zone, the control cover defining light diffusion channel extending into the bottom surface of the control cover, and a light diffuser extending into the light diffusion channel to define a light recess configured to receive the light source, light recess being offset from the indicator zone by a diffusion distance measured perpendicular to the illumination direction.

In another exemplary aspect of the present disclosure, a dishwasher appliance defining a vertical direction, a lateral direction, and a transverse direction is provided. The dishwasher appliance includes a wash tub positioned within a cabinet and defining a wash chamber, a door pivotally mounted to the cabinet to provide selective access to the wash chamber: and a control panel mounted on the door and defining an illumination direction. The control panel includes a printed circuit board defining a top surface, a light source mounted to the top surface of the printed circuit board for selectively generating light, a control cover mounted to the top surface of the printed circuit board, the control cover comprising a bottom surface, a top surface, and an indicator zone, the control cover defining light diffusion channel extending into the bottom surface of the control cover, a light diffuser extending into the light diffusion channel to define a light recess configured to receive the light source, light recess being offset from the indicator zone by a diffusion distance measured perpendicular to the illumination direction, and an overlay panel mounted on the top surface of the control cover, the overlay panel comprising at least one diffused indicator zone aligned with the indicator zone in the illumination direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same or similar reference numerals in the figures denotes the same or similar features unless the context indicates otherwise.

DETAILED DESCRIPTION

Figure 1:
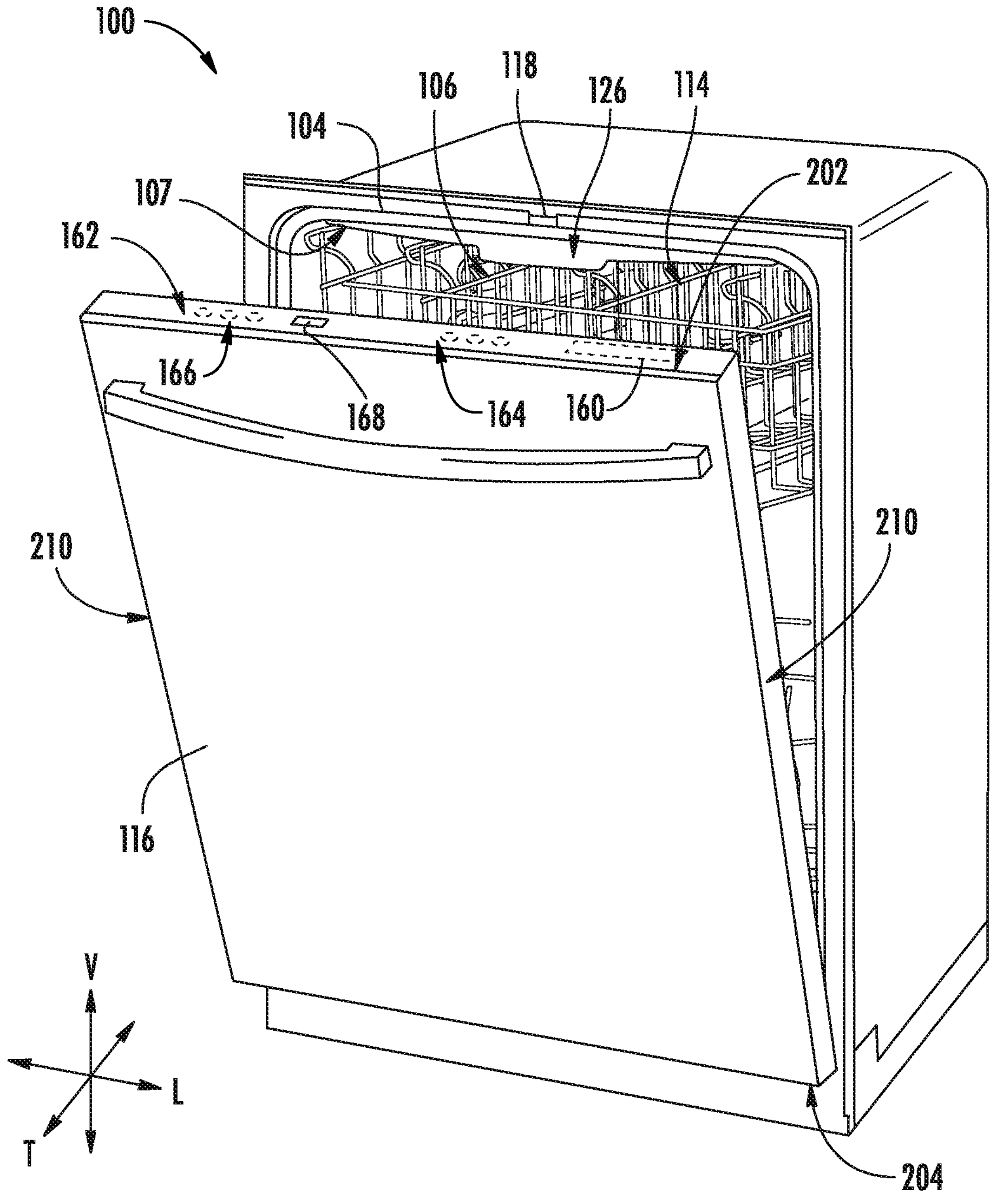
FIG. 1 provides a perspective view of a dishwasher appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the term "or" is generally intended to be inclusive (i.e., "A or B" is intended to mean "A or B or both"). Furthermore, as used herein, terms of approximation, such as "approximately," "substantially," or "about," refer to being within a ten percent margin of error.

The present invention advantageously provides a control panel for an appliance that may provide increased diffusion over a short distance. Advantageously, embodiments described herein may provide a diffused light display on the control panel that is even in light intensity throughout a diffused indicator zone on an overlay panel of the control panel with a control panel with an attached control board with light sources. Light sources of the light shining through the diffused indicator zone may therefore be located relatively close to the overlay panel, which would limit light intensity or diffusion by a direct route. Embodiments may improve user experience by having a more even light distribution. Costs may be decreased by embodiments described herein. Common console covers may be used over various board constructions using embodiments described herein.

Figure 2:
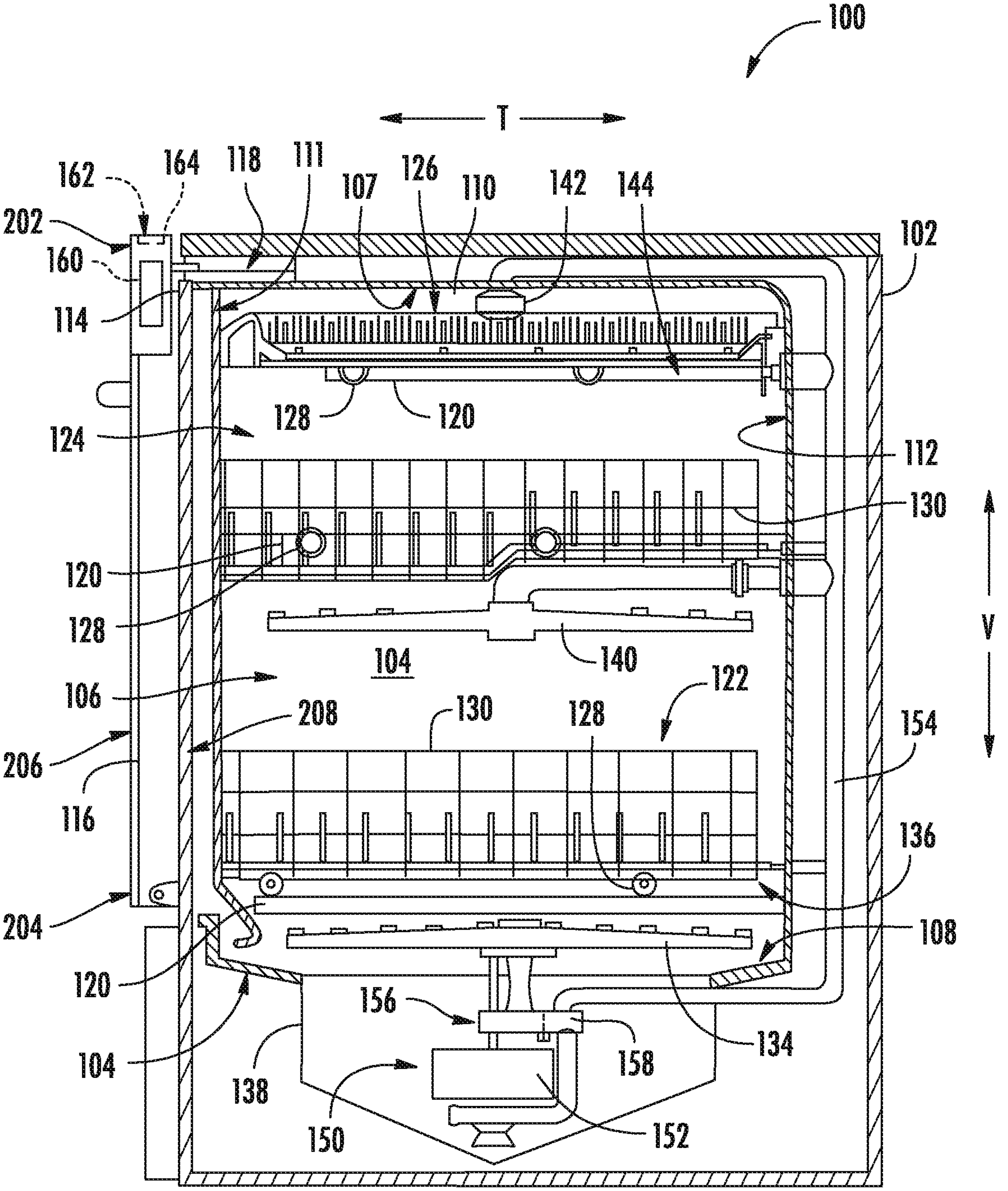
FIG. 2 provides a side, cross sectional view of the exemplary dishwasher appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually orthogonal to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

As illustrated in FIG. 2, tub side walls 110 may accommodate a plurality of rack assemblies. More specifically, guide rails 120 may be mounted to side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles (e.g., during a cleaning or rinsing cycle). According to another exemplary embodiment, a silverware basket (not shown) may be removably attached to a rack assembly (e.g., lower rack assembly 122) for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water or wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies (e.g., to mid-level spray arm assembly 140 and upper spray assembly

142). However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156 (e.g., which may be positioned within sump 138 of dishwasher appliance 100). Diverter assembly 156 may include a diverter disk (not shown) disposed within a diverter chamber 158 for selectively distributing the wash fluid to the spray arm assemblies 134, 140, 142 or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level or upper spray assemblies 140, 142 (e.g., such as primary supply conduit 154).

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116, as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or electro-mechanical input devices including rotary dials, push buttons, and touch pads. The user interface 164 may further include one or more display components 168, such as a digital display device or one or more indicator light assemblies designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter. Moreover, aspects of the present subject matter may be applied to other appliances as well, such as refrigerators, ovens, microwaves, etc.

Referring now generally to FIGS. 3 through 8, a door assembly 200 will be described according to exemplary embodiments of the present subject matter. For example, door assembly 200 may be used as door 116 of dishwashing appliance 100. Alternatively, door assembly 200 may be used on any other suitable residential or commercial appliance. As described herein, door assembly 200 may share a coordinate system with dishwashing appliance 100, e.g., when door assembly 200 is in the closed position (e.g., as shown in FIG. 2). Specifically, door assembly 200 may define a vertical direction V, a lateral direction L, and a transverse direction T. Therefore, these directions may be used herein to refer to features of door assembly 200 and its various components and sub-assemblies. Referring briefly again to FIGS. 1 and 2, in the normally closed position, door assembly 200 (illustrated for example as door 116) extends from a top end or top edge 202 to a bottom end or bottom edge 204 along the vertical direction V: from a front end 206 to a rear end 208 along the transverse direction T: and between two lateral ends 210 along the lateral direction L.

Figure 3:
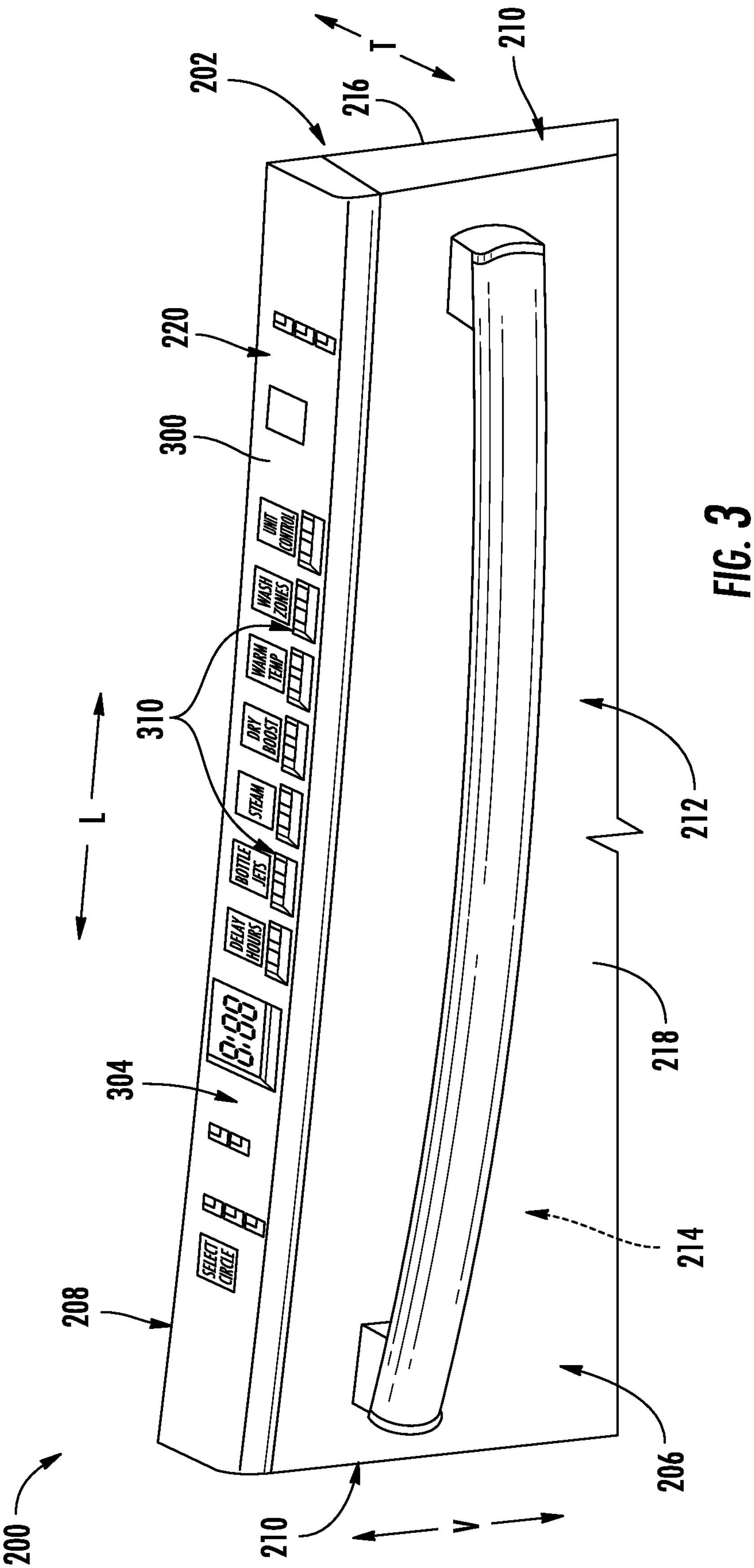
FIG. 3 provides a perspective view of a portion of a door of a dishwasher appliance according to exemplary embodiments of the present disclosure.

As best illustrated in FIG. 3, door assembly 200 may include a door frame 212 that is formed from one or more exterior panels. In general, these exterior panels of door frame define an interior chamber 214 of door assembly 200.

For example, door assembly 200 generally includes an inner door panel 216 and an outer door panel 218 which are spaced apart from each other along the transverse direction T to define a door gap or interior chamber 214 of door assembly 200 therebetween. For instance, outer door panel 218 may be positioned at or proximal to the front end 206 (i.e., distal to the rear end 208) and inner door panel 216 may be positioned at or proximal to the rear end 208 (i.e., distal to the front end 206).

According to exemplary embodiments, inner door panel 216 and outer door panel 218 may be panels that are stamped from stainless steel. Alternatively, inner door panel 216 and outer door panel 218 may be formed from any other suitably rigid material, such as thermoformed plastic, other metals, etc. In general, inner door panel 216 and outer door panel 218 may be assembled in any suitable manner. In addition, inner door panel 216 and outer door panel 218 may be secured together using any suitable mechanical fastener, welding, snap-fit mechanisms, etc. In addition, it should be appreciated that an insulating material (not shown), such as fiberglass or foam insulation, may be positioned within interior chamber 214 to provide thermal and/or sound insulation to dishwashing appliance 100.

As illustrated, door assembly 200 may generally include a control panel 220 that is mounted on door assembly 200 and is generally configured for facilitating user interaction with the dishwasher 100. In this regard, for example, control panel 220 (e.g., which may correspond to control panel 162 from FIG. 1) may be in direct operative communication with controller 160 of dishwasher 100, such that user inputs via control panel 220 may be directly used to regulate operation of various components of dishwasher 100.

According to the illustrated embodiment, control panel 220 may be positioned on top edge 202 door assembly 200 along the vertical direction V. Thus, e.g., control panel 220 may be partially hidden below a countertop when dishwasher appliance 100 is installed below the countertop and door 116 (e.g., door assembly 200) is closed. Accordingly, dishwasher appliance 100 may be referred to as a "top control dishwasher appliance." However, it should be appreciated that aspects of the present subject matter may be used with dishwasher appliances having other configurations or any other suitable appliance. For example, control panel 220 may be mounted on a front end 206 of door assembly 200 or may be mounted directly to an appliance cabinet or other suitable support structure for regulating the operation of any suitable appliance.

According to exemplary embodiments of the present subject matter, control panel 220 may generally define a display direction or illumination direction (e.g., identified generally by reference numeral 222). In general, illumination direction 222 may refer to the direction along which a user typically views control panel 220. For example, for a top control dishwasher appliance, the illumination direction 222 may generally extend normal to top edge 202 of door assembly 200. In other words, illumination direction 222 extends along the vertical direction V when door assembly 200 is in the closed position and along the transverse direction T when door assembly 200 is in the fully open position. By contrast, for front display dishwasher appliances, the illumination direction 222 may extend out a front end 206 door assembly 200. It should be appreciated that the directional orientations provided herein are only intended to facilitate discussion of aspects of the present subject matter, e.g., to describe the relative positioning of various components of control panel 220. However, it should be appreciated that these directional orientations may vary depending on the construction of the door assembly while remaining within the scope of the present subject matter.

Figure 4:
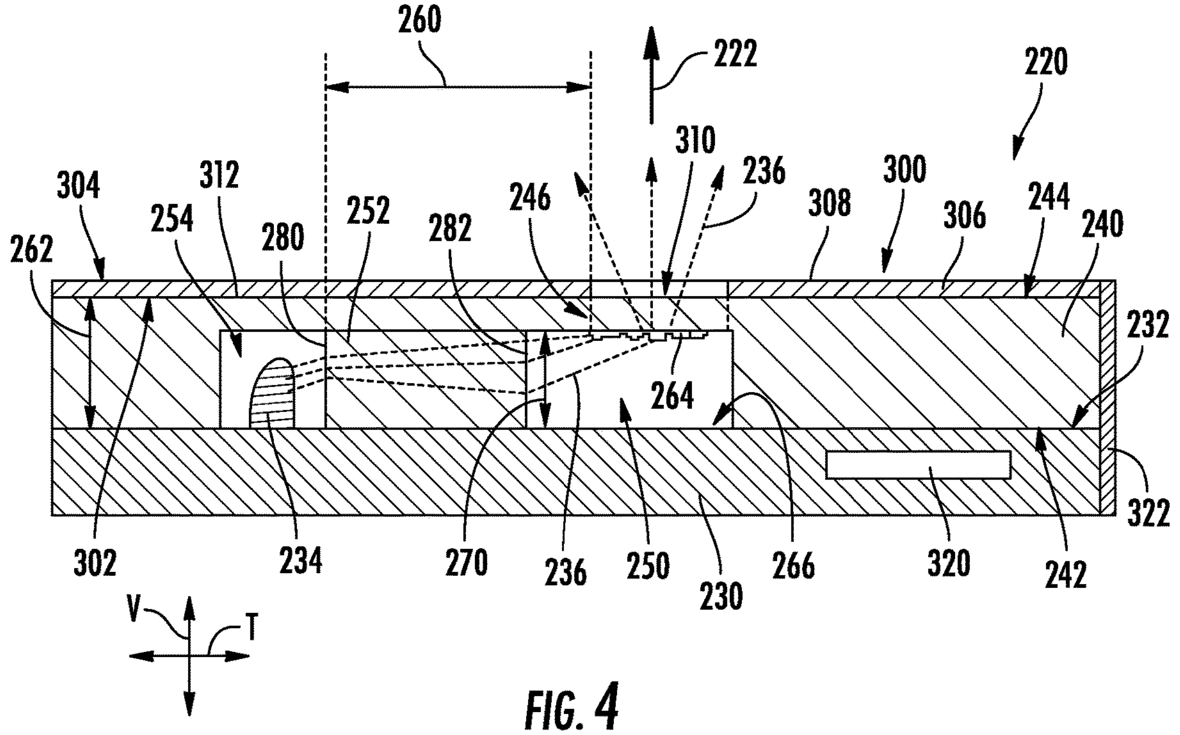
FIG. 4 provides a side, cross sectional view of a control panel that may be used with the exemplary door of FIG. 3 according to exemplary embodiments of the present disclosure.
Figure 5:
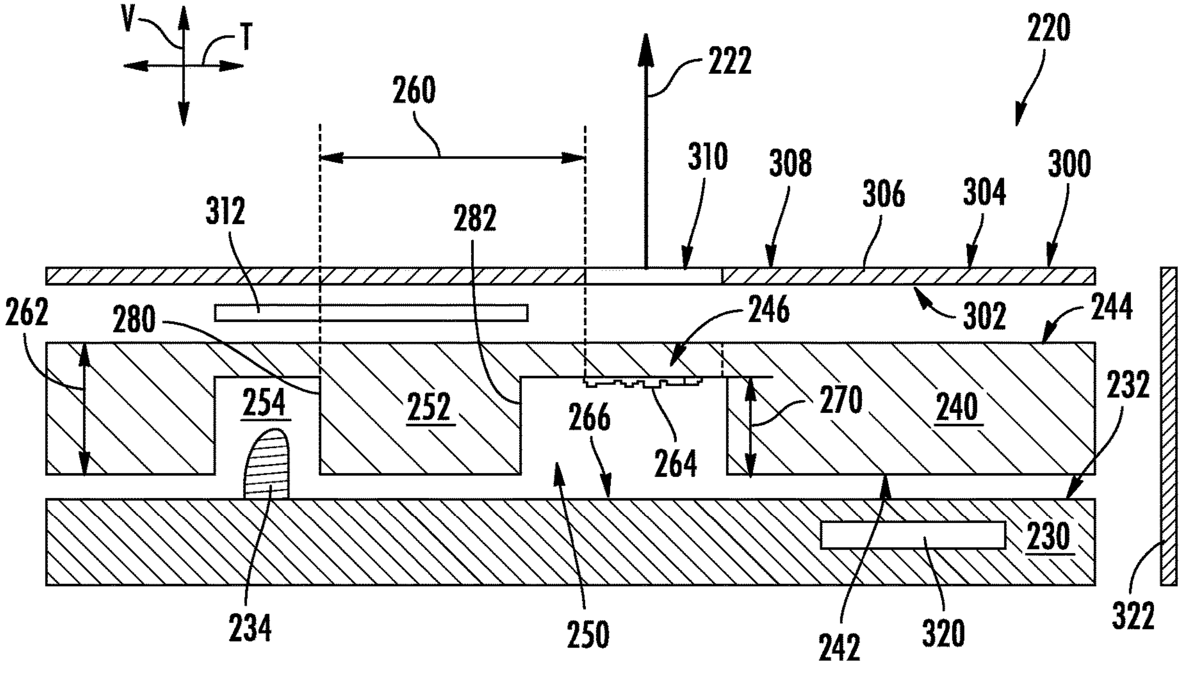
FIG. 5 provides an expanded side, cross sectional view of the exemplary control panel of FIG. 4 according to exemplary embodiments of the present disclosure.

Referring now specifically to FIGS. 4 and 5, control panel 220 may generally include a user interface board or printed circuit board 230 that may generally be configured for supporting controller 160 and various other control inputs or outputs of dishwasher appliance 100. More specifically, as understood by one of ordinary skill in the art, printed circuit board 230 may include or be operably coupled to one or more user inputs (e.g., user inputs 166) for receiving user input and/or to one or more displays or indicators (e.g., display components 168) for providing user notifications, e.g., by illuminating indicators to indicate cycles or operating status.

According to the illustrated embodiment, printed circuit board 230 generally extends along a horizontal plane (e.g., along the lateral direction L and the transverse direction T) within door assembly 200. More specifically, printed circuit board 230 may extend along the lateral direction L within door assembly 200, e.g., at least partially between lateral ends 210. In addition, printed circuit board 230 may generally extend along the transverse direction T between front end 206 and rear end 208 of door assembly 200. According to the illustrated embodiment, printed circuit board 230 generally defines a top surface 232 that extends within a horizontal plane when door assembly 200 is in the closed position.

According to the illustrated embodiment, door assembly 200 may further include at least one light source 234 that is mounted to top surface 232 of printed circuit board 230 for selectively generating light. In this regard, light source 234 may be configured for illuminating indicators, control inputs, or other features on control panel 220. These light sources 234 may include any suitable number, type, configuration, and orientation of light sources mounted at any suitable location to illuminate status indicators or buttons in any suitable colors, sizes, patterns, etc.

In other words, light sources 234 may be provided as any suitable number, type, position, and configuration of electrical light source(s), using any suitable light technology and illuminating in any suitable color. For example, according to the illustrated embodiment, light sources 234 may include one or more light emitting diodes (LEDs), which may each illuminate in a single color (e.g., white LEDs), or which may each illuminate in multiple colors (e.g., multi-color or RGB LEDs) depending on the control signal from controller 160.

However, it should be appreciated that according to alternative embodiments, light sources 234 may include any other suitable traditional light bulbs or sources, such as halogen bulbs, fluorescent bulbs, incandescent bulbs, glow bars, a fiber light source, etc. Moreover, light sources 234 may be operably coupled (e.g., electrically coupled) to printed circuit board 230, another suitable control board, and/or controller 160 (FIG. 2). Activation or illumination of light sources 234 may be generally controlled by a printed circuit board 230 or controller 160 (e.g., to indicate a user input, state of the dishwasher appliance, state of the wash cycle, or any other relevant information to a user).

According to exemplary embodiments, light sources 234 may include one or more orthogonal light emitting devices, referred to herein as side-fire light sources or LEDs (e.g., generating light 236 substantially perpendicular to the illumination direction 222). According to exemplary embodiments, side-fire LEDs are generally configured for directing a beam of light energy substantially within a horizontal plane (e.g., as identified by the transverse direction T and/or the lateral direction L). Additionally or alternatively, light sources 234 may include one or more vertically oriented light sources, referred to herein as top-fire light sources or light-emitting diodes (LEDs). In this regard, top-fire LEDs are generally configured for directing light primary along the vertical direction V when door assembly 200 is in the closed position (e.g., generating light 236 parallel to the illumination direction 222).

As best illustrated in FIGS. 4 through 8, control panel 220 may generally include a control cover 240 that is mounted to printed circuit board 230. In this regard, for example, control cover 240 may be any suitable electrically insulated and opaque material that is mounted on top surface 234 of printed circuit board 230, e.g., to serve as a rigid support to facilitate user interaction with control panel 220. For example, according to the illustrated embodiment, control cover 240 may define a bottom surface 242 that is mounted in direct contact against top surface 232 of printed circuit board 230. In this regard, bottom surface 242 and top surface 232 may be substantially planar surfaces that extend along the horizontal direction when door assembly 200 is in the closed position. According to alternative embodiments, printed circuit board 230 could also be mounted with adhesive between the top surface of printed circuit board 230 and bottom surface 242 of control cover 240, may be spaced at a set distance, etc. In addition, control cover 240 may define a top surface 244 that is positioned opposite a bottom surface 242 along the illumination direction 222 (e.g., along the vertical direction V when door assembly 200 is in the closed position).

Referring still generally to FIGS. 4 through 8, control cover 240 may define features for receiving and distributing light for improved appearance, simplified manufacturing of control panel 220, and improved user satisfaction. In this regard, as illustrated, control cover 240 may define a light diffusion channel 250 extending into bottom surface 242 of control cover 240. As explained in more detail below, light diffusion channel 250 is generally configured for receiving light sources 234 and includes internal features for improving light distribution. In addition, light diffusion channel 250 permits flush mounting of control cover 240 to printed circuit board 230, e.g., without physical interference from light sources 234.

According to an example embodiment, control panel 220 further includes a light diffuser 252 extending into light diffusion channel 250 for selectively directing light 236. More specifically, for example, light diffuser 252 may be formed as a part of control cover 240, may be attached to control cover 240 or printed circuit board 230, or may be otherwise positioned within light diffusion channel 250. In this manner, light diffuser 252 may define a light recess 254 within light diffusion channel 250. Light recess 254 extends into bottom surface of control cover 240, e.g., and may extend in the illumination direction 222.

According to example embodiments, light recess 254 is generally configured to receive light source 234. For example, each light source 234 attached to printed circuit board 230 may be housed by a light recess 254 or multiple light sources 234 may be housed in a light recess 254, depending on the needs of the embodiment. In this regard, for example, light recess 254 may be sized (e.g., depth, width, etc.) for receiving light source 234 without causing interference between control cover 240 and printed circuit board 230 when installed. As such, light recess 254 may have a light source height at least equal to a height of the light source 234. The height may be a measurement taken in the illumination direction 222, e.g., along vertical direction V.

According to example embodiments, light recess 254 may be offset from indicator zone 246 by a diffusion distance 260 measured perpendicular to the illumination direction 222. In other words, light source 234 may be set back from indicator zone 246 by diffusion distance 260. Diffusion distance 260 may be generally measured along a horizontal plane (e.g., lateral direction L or transverse direction T), e.g., perpendicular to illumination direction 222 when door assembly 200 is closed.

In addition, control cover 240 may generally define a thickness 262 measured along the illumination direction 222. According to example embodiments, diffusion distance 260 is greater than 1.5 times, greater than 2 times, greater than 3 times, greater than 5 times, or greater, than thickness 262. In this manner, the distance along which light 236 travels before reaching indicator zone 246 is increased, thereby permitting improved distribution and diffusion for a more uniform appearance to a user.

As illustrated in the figures, control cover 240 may further include a textured surface 264 defined at indicator zone 246, e.g., being aligned with indicator zone 246 in the illumination direction 222. In this regard, textured surface 264 may be any pattern of bumps, divots, protrusions, or other features defined on control cover 240 for improving the diffusion of light 236. According to still other embodiments, textured surface 264 may include any suitable surface coating or treatment for affecting the direction, intensity, or distribution of light 236. In addition, printed circuit board 230 may include a light reflective surface 266 on the top surface 232 to redirect light 236 from light source 234 towards indicator zone 246. Other surface treatments are possible and within the scope of the present subject matter.

The geometry and configuration of light diffusion channel 250 and light diffuser 252 may also include features for improving the light distribution or uniformity. For example, light diffusion channel 250 may be tapered along a direction perpendicular to the illumination direction 222. In this regard, light diffusion channel 250 may taper toward indicator zone 246 such that a channel depth 270 of light diffusion channel 250 decreases from light recess 254 toward indicator zone 246. In addition, according to the illustrated embodiment, light diffuser 252 extends across the channel depth 270 fully from control cover 240 to top surface 232 of printed circuit board 230. In other words, light diffuser 252 may be tapered in a manner similar to light diffusion channel 250 such that a bottom of light diffuser 252 sits flush on printed circuit board 230.

According to still other embodiments, light diffuser 252 may extend only partially along channel depth 270, e.g., to provide a path for bleed light to reach indicator zone 246 without passing through light diffuser 252. In addition, one or more lens channels 272 may be positioned adjacent to light diffuser 252 and extend between light recess 254 and indicator zone 246. In this manner, the primary beam of light 236 may pass through light diffuser 252, while at least a portion of the light 236 may bleed around light diffuser 252, e.g., between control cover 240 and light diffuser 252.

Figure 6:
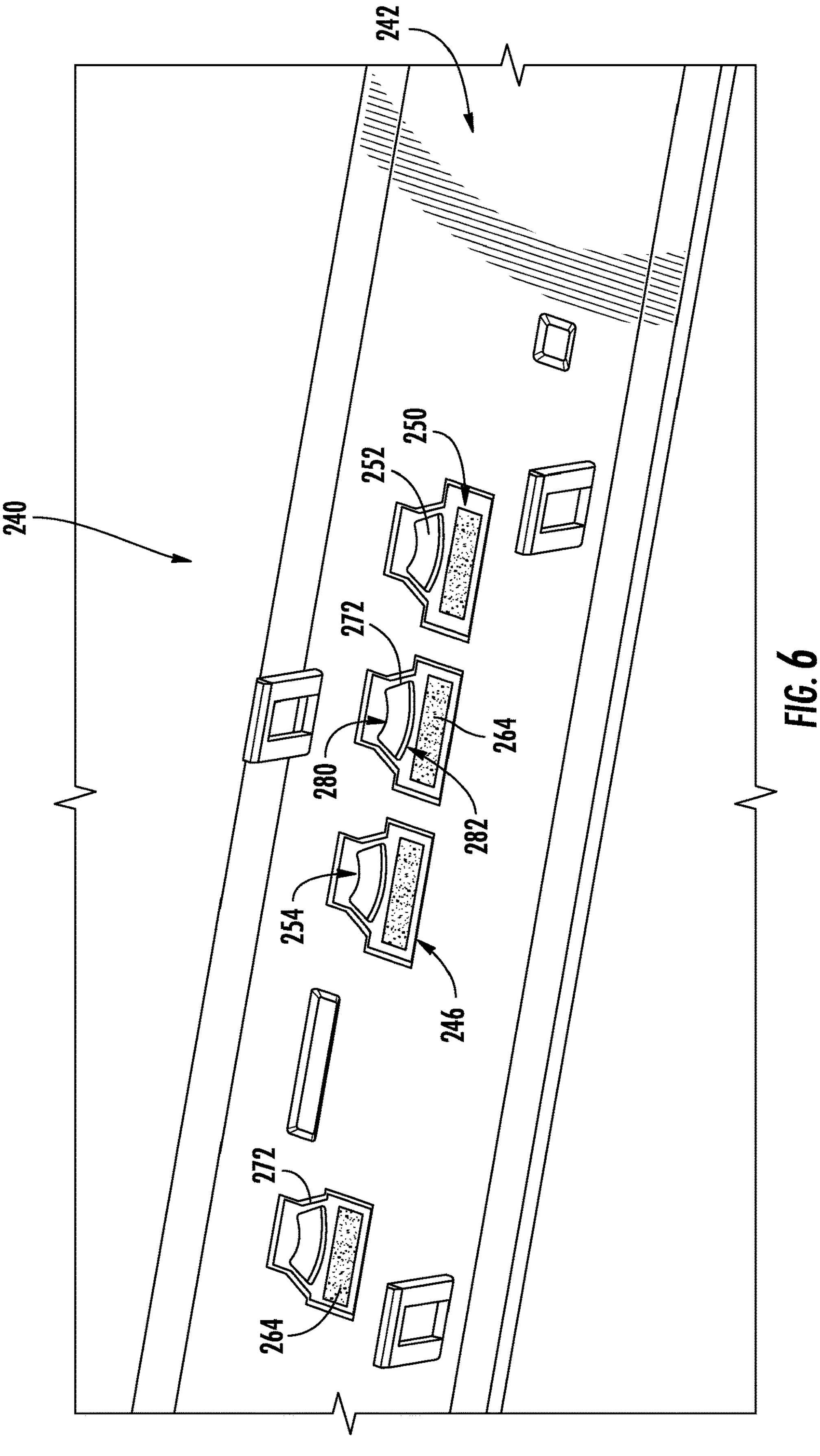
FIG. 6 provides a bottom, perspective view of a control cover of the exemplary control panel of FIG. 4 according to exemplary embodiments of the present disclosure.
Figure 7:
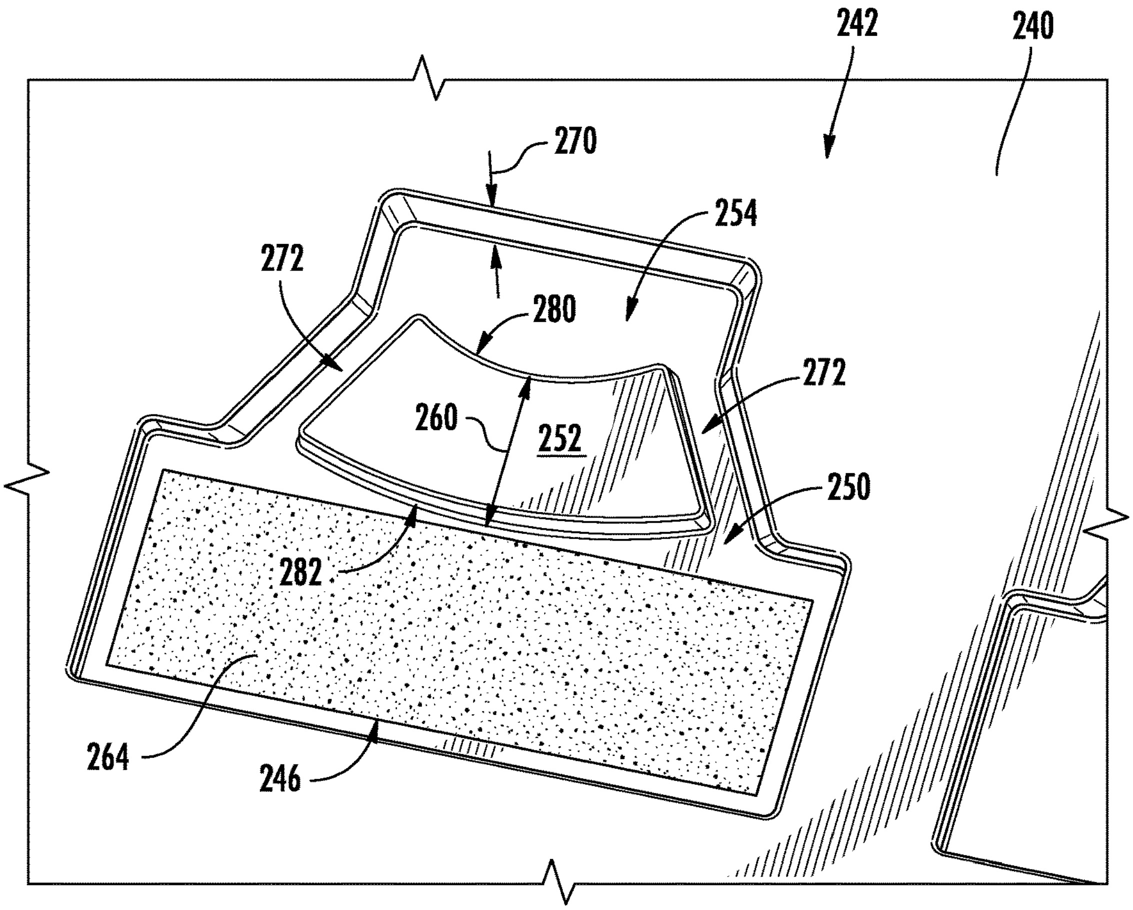
FIG. 7 provides a perspective view of a light diffusion channel and a light diffuser of the exemplary control cover of FIG. 6 according to exemplary embodiments of the present disclosure.

According to the illustrated embodiment shown in FIGS. 6 and 7, light diffuser 252 is an arcuate member. In this regard, for example, light diffuser 252 may define an inner concave edge 280 facing light source 234 for broadening the generated light 236 as it shines toward indicator zone 246. In this regard, inner concave edge 280 is concave when viewed from light source 234. In addition, light diffuser 252 may include an outer convex edge 282 facing indicator zone 246 opposite inner concave edge 280. In this regard, outer convex edge 282 is convex when viewed from indicator zone 246.

Notably, the arcuate design of light diffuser 252 may serve to spread light 236 as it emanates from light source 234. According to example embodiments, inner concave edge 280 has a different radius of curvature than outer convex edge 282. In this regard, for example, inner concave edge 280 may have a radius of curvature that is smaller than a radius of curvature of outer convex edge 282, e.g., when measured from light source 234. This variation may serve to fan out or spread light 236 as it approaches indicator zone 246.

Figure 8:
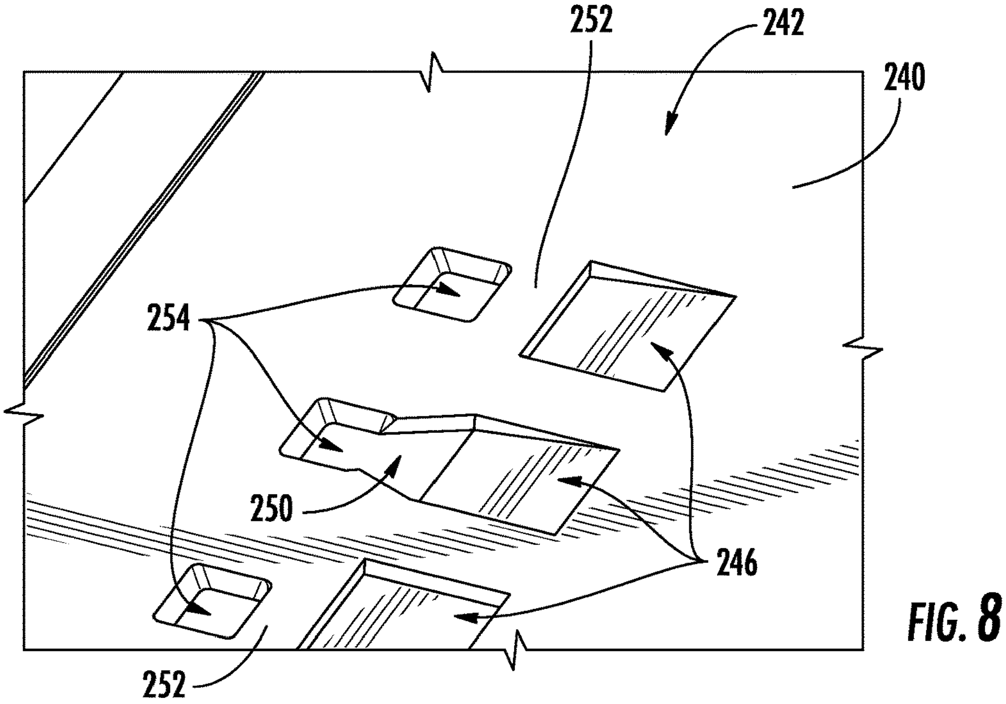
FIG. 8 provides a bottom, perspective view of a control cover of the exemplary control panel of FIG. 4 according to another exemplary embodiment of the present disclosure.

It should be appreciated that the geometry and configuration illustrated herein for control cover 240 is only exemplary and that changes may be made to the design shown while remaining within the scope of the present subject matter. For example, according to still other embodiments, light diffusion channel 250 and light diffuser 252 may take any other suitable size, shape, etc. For example, as shown in FIG. 8, the geometry of the light diffusion channel 250 may vary, the light recess 254 may be isolated (e.g., lens channels 272 may be removed), etc.

In addition, an overlay panel 300 may be mounted on top of control cover 240. More specifically, overlay panel 300 may include a bottom surface 302 that is seated directly against top surface 244 of control cover 240. In addition, overlay panel 300 may include a top surface 304 that is directly interacted with by a user of dishwasher appliance 100. In general, overlay panel 300 may be any suitable panel for dead fronting control panel 220 to a user of dishwasher appliance 100. As used herein, the term "dead front" and the like is generally intended to refer to portions of a control panel which may be used as indicators, buttons, interactive control surfaces, or other user-interaction features without exposing the user to the operating side of the equipment or live parts and connections, i.e., lights, electrical connections, etc. According to exemplary embodiments, overlay panel 300 may further include a diffusion layer that is printed or applied to bottom surface 302 of overlay panel 300 to help facilitate distribution of light 236.

For example, overlay panel 300 may include a transparent or translucent body 306 and an opaque masking material 308 that is selectively printed on top surface 304 (or bottom surface) of translucent body 306 to define one or more diffused indicator zones 310 (e.g., corresponding to user inputs 166 or other indicators) and/or other illuminated features on control panel 220. In this regard, an opaque masking material 308 may be deposited on translucent body 306, may be applied using an adhesive, or may be applied in any other manner to define any suitable number, size, and configuration of illuminated features. These illuminated features may be shapes or include other forms such as symbols, words, etc. that are visible on control panel 220. More specifically, when light sources 234 are energized, diffused indicator zones 310 that correspond to the user inputs 166 or other indicators may be illuminated. Thus, the dead fronted top surface 304 may be the surfaces that are contacted for controlling dishwasher appliance 100 or which may be illuminated for purposes of indicating operating status or other conditions to the user of the dishwasher appliance 100. Indicator zone 246 may further be aligned with diffused indicator zone 310 in illumination direction 222.

Although overlay panel 300 is described above as including translucent body 306 and opaque masking material 308, it should be appreciated that overlay panel 300 may alternatively be any suitable overlay on control cover 240, e.g., such as a printed overlay, an in-mold label, a decorative/graphic layer, inks, hard coats, or any other suitable overlay material. In addition, it should be appreciated that overlay panel 300 may include any suitable finish, such as a matte finish, a glossy finish, an opaque finish, a translucent finish, etc. In addition, according to example embodiments, control panel 220 may include a masking layer 312 positioned between control cover 240 and overlay panel 300. In this regard, masking layer 312 may generally be positioned over light recess 254 to block light 236 from traveling along the illumination direction 222, e.g., along the vertical direction V through overlay panel. For example, masking layer 312 may be formed from any suitable material for blocking light, e.g., such as a printed film, a thin coating, a vacuum metallization layer, etc.

According to an exemplary embodiment, diffused indicator zones 310 may correspond to user input buttons 166. In this regard, control panel 220 may include a plurality of capacitive sensors 320 which are mounted below selected diffused indicator zones 310 and are operable to detect user inputs on overlay panel 240 of control panel 220. For example, a capacitive sensor 320 may be mounted to printed circuit board 230 and may be configured for triggering when a user touches a top surface 304 of overlay panel 300 proximate the capacitive sensor 320. In particular, capacitive sensors 320 can detect when a finger or another conductive material with a dielectric different than air contacts or approaches control panel 220.

When a user touches top surface 304 of overlay panel 300 adjacent one of capacitive sensors 320, such capacitive sensor 320 triggers and, e.g., signals a controller (e.g., controller 160). In such a manner, operations of dishwasher appliance 100 can be initiated and controlled. Capacitive sensors 320 may be distributed laterally on printed circuit board 230 below overlay panel 300. It will be understood that other any suitable number, type, and position of capacitive sensors 320 may be used while remaining within the scope of the present subject matter. Indeed, any suitable number, type, and configuration of touch buttons or user inputs 166 may be used while remaining within the scope of the present subject matter.

In general, control cover 240 and/or overlay panel 300 may be constructed from any suitably rigid material to facilitate operation of dishwasher appliance 100. For example, it should be appreciated that various features of control panel 220 may be formed by injection molding, e.g., using a suitable plastic material, such as injection molding grade Poly butylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of control panel 220 may be formed from any other suitable rigid material.

According to example embodiments, control panel 220 may further include a gasket 322 that at least partially surrounds an edge of control cover 240. In general, gasket 322 may serve to isolate interior chamber 214 of door assembly 200 while also preventing light 236 from bleeding through control cover 240.

As explained in detail herein, aspects of the present subject matter are generally directed to a home appliance user interface that uses light to communicate appliance status and user selection. For example, capacitive touch controls that are directly adhered to the plastic user interface may have unique struggles with diffusing lights located in a shorter distance from LED to the user interface. Aspects of the present subject matter may use no additional parts and facilitate light diffusion by lengthening the distance from an indicator to the LED via geometry and other diffusion features. A side fire led may be set back from an indicator zone by a minimum distance, ensuring diffusion in a recess below the indicator zone (angled surface) that extracts the light travelling sideways in a cover and redirects it up to the user. Additionally, the LED and backlit zone may be constructed in a single combined recess, and texturing on an extraction surface and a white silk screen on the PCB may be used to increase light extraction. Accordingly, user experience may be improved, costs for achieving backlit words/indicators may be reduced, and common console covers may be maintained across various board constructions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control panel for an appliance, the control panel defining an illumination direction and comprising:

a printed circuit board defining a top surface;

a light source mounted to the top surface of the printed circuit board for selectively generating light;

a control cover mounted to the top surface of the printed circuit board, the control cover comprising a bottom surface, a top surface, and an indicator zone, the control cover defining a light diffusion channel extending into the bottom surface of the control cover; and a light diffuser extending into the light diffusion channel to define a light recess configured to receive the light source, the light recess being offset from the indicator zone by a diffusion distance measured perpendicular to the illumination direction.

2. The control panel of claim 1, further comprising:

an overlay panel mounted on the top surface of the control cover, the overlay panel comprising at least one diffused indicator zone aligned with the indicator zone in the illumination direction.

3. The control panel of claim 2, wherein the overlay panel comprises a matte finish.

4. The control panel of claim 2, further comprising:

a masking layer positioned between the control cover and the overlay panel over the light recess to block light from traveling along the illumination direction.

5. The control panel of claim 4, wherein the masking layer comprises a vacuum metallization layer.

6. The control panel of claim 1, wherein the light source is configured to direct light substantially perpendicular to the illumination direction.

7. The control panel of claim 1, wherein the control cover has a thickness measured along the illumination direction, and the diffusion distance is greater than 3 times the thickness of the control cover.

8. The control panel of claim 1, wherein the control cover further comprises:

a textured surface defined at the indicator zone and being aligned with the indicator zone in the illumination direction.

9. The control panel of claim 1, wherein the printed circuit board further comprises:

a light reflective surface on the top surface to redirect the light from the light source towards the indicator zone.

10. The control panel of claim 1, wherein the light diffusion channel tapers toward the indicator zone such that a depth of the light diffusion channel decreases towards the indicator zone from the light recess.

11. The control panel of claim 1, wherein the light diffusion channel defines a channel depth, and wherein the light diffuser extends across the channel depth fully from the control cover to the top surface of the printed circuit board.

12. The control panel of claim 1, wherein the light diffuser is arcuate and comprises an inner concave edge facing the light source for broadening the light source towards the indicator zone.

13. The control panel of claim 12, wherein the light diffuser comprises an outer convex edge facing the indicator zone and opposite the inner concave edge.

14. The control panel of claim 13, wherein the inner concave edge has a different radius of curvature than the outer convex edge.

15. The control panel of claim 13, wherein the inner concave edge has a radius of curvature smaller than a radius of curvature of the outer convex edge.

16. The control panel of claim 1, wherein the control cover defines one or more lens channels adjacent the light diffuser and extending between the light recess and the indicator zone.

17. The control panel of claim 1, further comprising a gasket surrounding an edge of the control cover.

18. A dishwasher appliance defining a vertical direction, a lateral direction, and a transverse direction, the dishwasher appliance comprising:

a wash tub positioned within a cabinet and defining a wash chamber;

a door pivotally mounted to the cabinet to provide selective access to the wash chamber; and a control panel mounted on the door and defining an illumination direction, the control panel comprising:

a printed circuit board defining a top surface;

a light source mounted to the top surface of the printed circuit board for selectively generating light;

a control cover mounted to the top surface of the printed circuit board, the control cover comprising a bottom surface, a top surface, and an indicator zone, the control cover defining a light diffusion channel extending into the bottom surface of the control cover;

a light diffuser extending into the light diffusion channel to define a light recess configured to receive the light source, the light recess being offset from the indicator zone by a diffusion distance measured perpendicular to the illumination direction; and an overlay panel mounted on the top surface of the control cover, the overlay panel comprising at least one diffused indicator zone aligned with the indicator zone in the illumination direction.

19. The dishwasher appliance of claim 18, wherein the light diffuser is arcuate and comprises an inner concave edge facing the light source for broadening the light source towards the indicator zone and an outer convex edge facing the indicator zone and opposite the inner concave edge.

20. The dishwasher appliance of claim 18, wherein the control cover defines one or more lens channels adjacent the light diffuser and extending between the light recess and the indicator zone.

* * * * *